United States Patent
Bates et al.

(10) Patent No.: US 10,951,922 B1
(45) Date of Patent: Mar. 16, 2021

(54) PASSENGER TAILORED CONTENT FOR VEHICLE ENTERTAINMENT SYSTEMS

(71) Applicant: Panasonic Avionics Corporation, Lake Forest, CA (US)

(72) Inventors: Steven Bates, Mission Viejo, CA (US); Philip Watson, Lake Forest, CA (US); Samir Lad, Dublin, CA (US); Anand Desikan, San Ramon, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/553,004

(22) Filed: Aug. 27, 2019

(51) Int. Cl.
*H04N 21/214* (2011.01)
*H04N 21/472* (2011.01)
*H04N 21/4788* (2011.01)
*H04N 21/431* (2011.01)
*H04N 21/45* (2011.01)

(52) U.S. Cl.
CPC ..... *H04N 21/2146* (2013.01); *H04N 21/4312* (2013.01); *H04N 21/4532* (2013.01); *H04N 21/4788* (2013.01); *H04N 21/47217* (2013.01)

(58) Field of Classification Search
CPC ........... H04N 21/2146; H04N 21/4312; H04N 21/4532; H04N 21/47217; H04N 21/4788; H04N 21/25891
See application file for complete search history.

(56) References Cited

U.S. PATENT DOCUMENTS

| 2013/0054375 A1* | 2/2013 | Sy ..................... G06Q 30/02 705/14.66 |
| 2013/0073388 A1 | 3/2013 | Heath |
| 2016/0286258 A1* | 9/2016 | Rajagopal .......... H04N 21/2146 |

(Continued)

FOREIGN PATENT DOCUMENTS

| CN | 104361502 | 2/2015 |
| WO | 2014072931 | 5/2014 |

OTHER PUBLICATIONS

Mehta, R.M., A Prediction Model of Airline Passenger Preference: Identifying factors that predict passenger preference between low cost and legacy carriers, dissertation submitted to College of Aeronautics Florida Institute of Technology, Sep. 2017.

*Primary Examiner* — John R Schnurr
(74) *Attorney, Agent, or Firm* — Perkins Coie LLP

(57) ABSTRACT

Vehicle entertainment systems can obtain and use a list of predicted entertainment preferences for passengers located in or expected to be in commercial passenger vehicles. A first server can obtain the predicted entertainment preferences and can identify a multimedia content for at least one passenger based on a predicted entertainment preference. A second server located in the commercial passenger vehicle can receive and send the multimedia content to a media playback device associated with the at least one passenger. The second server can receive, from the media playback device, an indication of a preference of the at least one passenger for watching or listening to the multimedia content; update, based on the received indication of the preference, the entertainment preference for the at least one passenger to obtain an updated entertainment preference; and transmit the updated entertainment preference for the at least one passenger to the first server.

19 Claims, 8 Drawing Sheets

(56) References Cited

U.S. PATENT DOCUMENTS

2017/0048664 A1* 2/2017 Zhang ................ H04L 67/22
2017/0358022 A1* 12/2017 Deak ................ H04W 4/027
2018/0053121 A1* 2/2018 Gonzalez ............ G06Q 10/025
2018/0234707 A1* 8/2018 Pujia ................ H04N 21/4532
2019/0014371 A1* 1/2019 Couleaud ............ H04N 21/431
2020/0221184 A1* 7/2020 Skliba .............. H04N 21/41407

* cited by examiner

PASSENGER TAILORED CONTENT FOR VEHICLE ENTERTAINMENT SYSTEMS

TECHNICAL FIELD

This document is directed generally to obtain and use predictive lists for passengers in commercial passenger vehicles.

BACKGROUND

Commercial travel has evolved to provide entertainment options to passengers traveling to their destinations. For example, in an airplane or train, entertainment options are provided on monitors located on the back of seats, where the monitors can enable passengers to watch movies or television shows as they travel to their destinations. The monitors can also provide travel related information to the passengers. For example, passengers can view a map with the current location of the airplane or train and an estimated time of arrival to their destinations. Thus, in-vehicle entertainment systems can be designed to provide passengers with a positive travel experience.

SUMMARY

This patent document describes exemplary vehicle entertainment systems that can obtain predicted entertainment preferences for passenger located in or expected to be in a commercial passenger vehicle. Based on the predicted entertainment preferences, a server located in the commercial passenger vehicle can instruct media playback devices associated with passengers to display multimedia content tailored to the passengers' predicted entertainment preferences.

An exemplary embodiment describes a system for providing infotainment to passengers on a commercial passenger vehicle. The system comprises a first server and a second server. The first server is configured to perform a first method comprising receiving a list of passenger preferences for passengers either located in or expected to board the commercial passenger vehicle, where the list of passenger preferences indicates entertainment preferences for the passengers; and identifying a multimedia content based on an entertainment preference of at least one passenger. The second server located in the commercial passenger vehicle, the second server configured to perform a second method comprising: receiving the multimedia content that is based on the entertainment preference of the at least one passenger; sending, to a media playback device associated with the at least one passenger, a message to display an option to watch or listen to the multimedia content, where a graphical user interface (GUI) of the media playback device displays a selectable icon for the multimedia content along with one or more selectable passenger preference indicators that enable the at least one passenger to indicate a preference for watching or listening to the multimedia content; receiving, from the media playback device, an indication of the preference of the at least one passenger for watching or listening to the multimedia content; updating, based on the received indication of the preference, the entertainment preference for the at least one passenger to obtain an updated entertainment preference; and transmitting the updated entertainment preference for the at least one passenger to the first server.

In some embodiments, the first server is configured to perform the first method further comprising: receiving a second list of passenger preferences for a second set of passengers either located in or expected to board a second commercial passenger vehicle, where the second list of passenger preferences indicates entertainment preferences for the second set of passengers, and where the second set of passenger comprises the at least one passenger that previously travelled on the commercial passenger vehicle; and identifying a second multimedia content based on the updated entertainment preference of the at least one passenger. A third server located in the second commercial passenger vehicle, the third server configured to perform a third method comprising: receiving the second multimedia content that is based on the updated entertainment preference of the at least one passenger; and sending, to the media playback device or a second media playback device associated with the at least one passenger, a message to display an option to watch or listen to the second multimedia content.

In some embodiments, the media playback device is a mobile device that belongs to the at least one passenger, or the media playback device is located behind a headrest of a seat in the commercial passenger vehicle and the second media playback device is located behind a second headrest of a second seat in the second commercial passenger vehicle.

In some embodiments, the list of passenger preferences includes names of the passengers and one or more entertainment preferences for each passenger.

In some embodiments, the one or more entertainment preferences includes any one of or more of a movie category, a music genre, a television show category, and news content category.

In some embodiments, the one or more entertainment preferences for at least some passengers are obtained based on social media information obtained for the at least some passengers from a social media platform. In some embodiments, the one or more entertainment preferences are obtained based on social media trends, social analytics, or press releases. In some embodiments, the preference includes an indication of whether the at least one passenger likes or dislikes the multimedia content. In some embodiments, the first server is not located within any passenger vehicle, and is a fixed location server, e.g., a ground-based server, and services more than one vehicle.

An exemplary method implemented by a server on a commercial passenger vehicle comprises receiving, by the server, a multimedia content based on an entertainment preference of at least one passenger; sending, to a media playback device in the commercial passenger vehicle and associated with the at least one passenger, a message to display an option to watch or listen to the multimedia content, where a graphical user interface (GUI) of the media playback device displays a selectable icon for the multimedia content along with one or more selectable passenger preference indicators that enable the at least one passenger to indicate a preference for watching or listening to the multimedia content; receiving, from the media playback device, an indication of the preference of the at least one passenger for watching or listening to the multimedia content; updating, based on the received indication of the preference, the entertainment preference for the at least one passenger to obtain an updated entertainment preference; and transmitting the updated entertainment preference for the at least one passenger to a first server that is not located within any passenger vehicle, and the first server is a fixed location server and services more than one vehicle. In one example, the fixed location server is a ground-based server.

In some embodiments, the list of passenger preferences includes names of the passengers and one or more entertainment preferences for each passenger. In some embodiments, the one or more entertainment preferences includes any one of or more of a movie category, a music genre, a television show category, and news content category. In some embodiments, the one or more entertainment preferences for at least some passengers are obtained based on social media information obtained for the at least some passengers from a social media platform, or the one or more entertainment preferences for at least some passengers are obtained based on a social media trend obtained from a social media platform, or the one or more entertainment preferences for at least some passengers are obtained based on social analytics or press releases. In some embodiments, the preference includes an indication of whether the at least one passenger likes or dislikes the multimedia content.

In an exemplary apparatus comprising a processor and a memory, the apparatus is implemented on a commercial passenger vehicle and configured to perform a method, the method comprises receiving a multimedia content based on an entertainment preference of at least one passenger; sending, to a media playback device in the commercial passenger vehicle and associated with the at least one passenger, a message to display an option to watch or listen to the multimedia content, where a graphical user interface (GUI) of the media playback device displays a selectable icon for the multimedia content along with one or more selectable passenger preference indicators that enable the at least one passenger to indicate a preference for watching or listening to the multimedia content; receiving, from the media playback device, an indication of the preference of the at least one passenger for watching or listening to the multimedia content; updating, based on the received indication of the preference, the entertainment preference for the at least one passenger to obtain an updated entertainment preference; and transmitting the updated entertainment preference for the at least one passenger to a first server that is in a fixed location and services more than one passenger vehicle and is not located within any passenger vehicle.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Currently, airplanes or other commercial vehicles use conventional in-vehicle entertainment systems to broadcast audio or video content to seatback devices located on the rear of the seat or to personal electronic devices (PEDs) (e.g., smartphone, laptops, or tablets) that belong to passengers. The audio or video content may include movies, television shows, or other content such as advertisements or flight safety video. Each seatback device has an enclosure that can have a processor executing custom software programs to receive messages or commands from an edge server and to display visual content on a display of the seatback device and to output sound to a headphone jack. Conventional in-vehicle entertainment systems can also wirelessly transmit audio or video content to PEDs that belong to passengers.

Conventional in-vehicle entertainment systems have several technical drawbacks. First, the audio or video content transmitted by conventional in-vehicle entertainment systems to seatback device and/or PEDs does not frequently change. For example, the audio or video content stored on a server in the vehicle is usually updated once a month in part because the audio or video content is not dependent on the passengers' preferences. Thus, in the above example, an airplane having a conventional in-vehicle entertainment system may present to its passengers the same audio or video content over a course of a month. Second, conventional in-vehicle entertainment systems are not scalable to incorporate additional software applications or functions at least because such systems are specifically designed for individual customers, such as vehicle manufacturers, maintenance crews, airplane companies, and cruise-line manufacturers.

Third, the in-vehicle entertainment systems are designed to provide all passengers traveling on a same airplane or ship with the same set of audio or video content. Thus, conventional in-vehicle entertainment systems present a same limited set of options to passengers to watch or listen to a limited set of audio or video content. Fourth, conventional in-vehicle entertainment systems are not designed to easily integrate with social media platforms. Social media platforms can allow people to be communicate with each other and to be informed about current events, latest trends in good health, latest red-carpet events, latest business news, etc., While technology can enable people to be constantly connected to one another via social media platforms, people cannot easily access or benefit from social media information with an in-vehicle entertainment system. Thus, this patent document describes exemplary vehicle entertainment systems, apparatus and methods to overcome at least the above described technical drawbacks with conventional in-vehicle entertainment systems.

Figure 1:
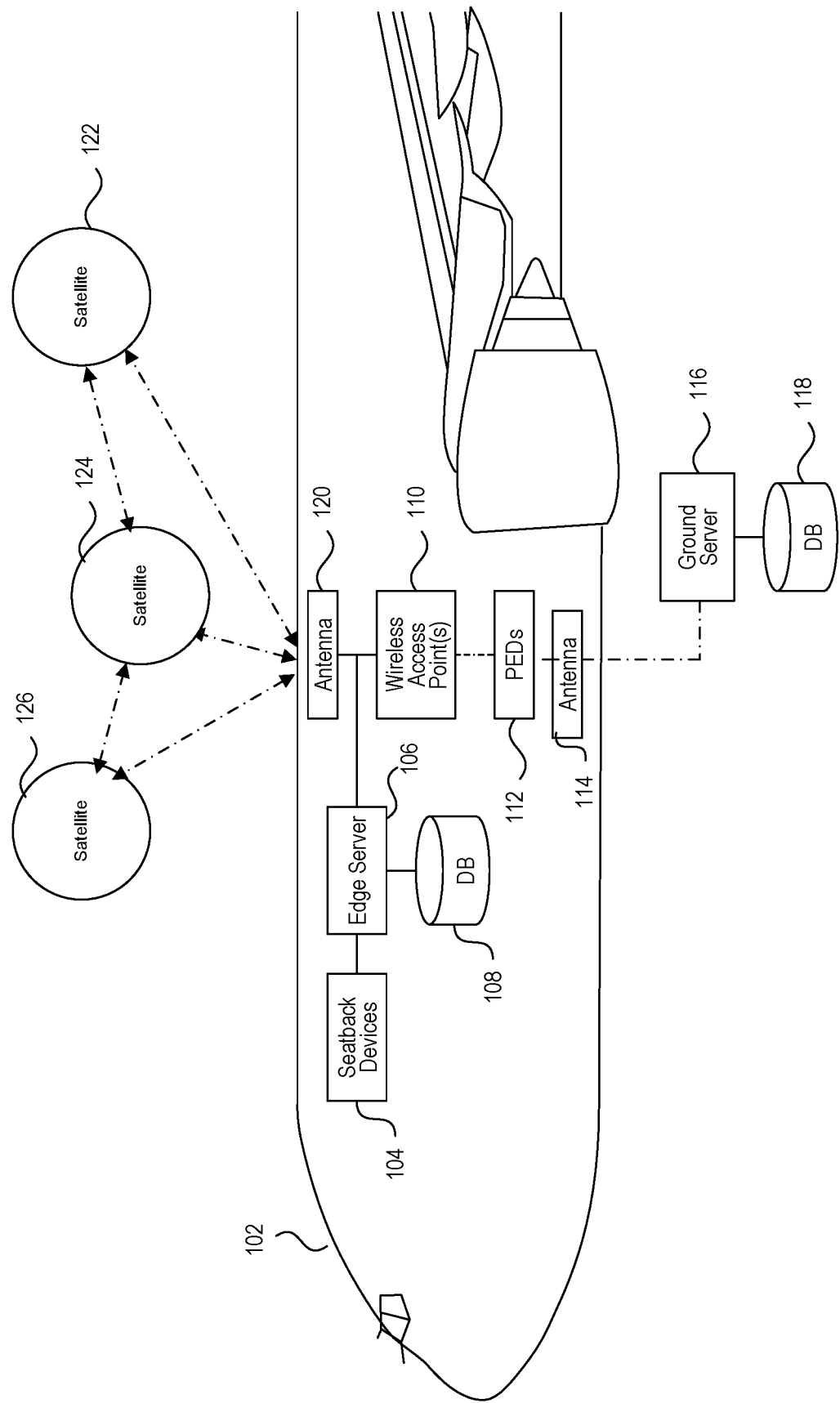
FIG. 1 shows an exemplary vehicle entertainment system installed in an airplane.

FIG. 1 shows an exemplary vehicle entertainment system 100 installed in an airplane 102. The vehicle entertainment system 100 includes an edge server 106 (or head-end server) located in the airplane 102. The edge server 106 is communicably coupled to the seatback devices 104 and PEDs 112 to provide multimedia contents (e.g., audio, video, image, webpage, etc.,) to the seatback devices 104 and/or PEDs. For example, the edge server 106 includes a content module (shown as 325 in FIG. 3) that may send multimedia contents to seatback devices 104 via an Ethernet switch, and the content module may send multimedia contents to PEDs 112 via one or more wireless access points 110. The content module of the edge server 106 can send a list of multimedia contents to be displayed on a graphical user interface (GUI) of the seatback devices 104 and/or the PEDs 112.

After a user selects a particular multimedia content via a seatback device or a PED, the seatback device or PED can send the user's selection information to the content module in the edge server 106, whereupon the content module can send the selected multimedia content back to the user's seatback device or PED. A seatback device and/or a PED can be considered a media playback device at least because the seatback device or a PED can display or play the multimedia content. The seatback devices 104 and PEDs 112 can include appropriate audio or video codecs stored thereon to play the multimedia contents provided by the edge server 102 or another device (e.g., media hard drive) located onboard the airplane 102.

The PEDs 112 can wirelessly communicate with one or more wireless access points 110. Thus, the PEDs 112 can be in communication with the ground server 116 or another server via the wireless access point(s) 110 and the antenna 114. This connection can enable the PEDs to access the Internet even when the airplane 102 is flying and the PEDs do not have cellular connectivity.

The example headings for the various sections below are used to facilitate the understanding of the disclosed subject matter and do not limit the scope of the claimed subject matter in any way. Accordingly, one or more features of one example section can be combined with one or more features of another example section.

A. Obtaining and Updating List of Passenger Preferences

In FIG. 1, the edge server 106 is in communication with a ground server 116 located on the ground (e.g., in an airport) via an antenna 114. The edge server 106 can advantageously obtain from the ground server 116 information about passengers so that the edge server 106 can, based on such information, provide customized entertainment options to passengers. For example, when the airplane 102 is waiting at an airport to board passengers or while the passengers are boarding the airplane 102, the edge server 106 can obtain from the ground server 116 a list of predicted preferences about passengers that are located in or are expected to board the airplane. The ground server 116 may store the list of predicted preferences for the passengers in a database 118. The database 118 can be stored in the ground server 116. In addition, the edge server 106 can be in communication with a ground server 116 through satellites 122, 124, and 126 (for example, when at high altitude, flying over a body of water, or area where there is limited signaling from the ground) via an antenna 120.

As further explained in Section B below, the list of passenger preferences may include information about passengers that may have been collected by the airlines and/or by a third-party (e.g., a social media platform). A list of passenger preferences may include a table that contains the names of each passenger that is expected to board the airplane 102, one or more predicted entertainment preferences for each passenger, and optionally seat number assigned to each passenger. One or more predicted entertainment preferences for a passenger may include any one of or more of the following entertainment categories preferred by the passenger: movies, music, television shows, on-line training classes (e.g., Udemy, Codecademy, edx, Coursera, Skillshare, Udacity, and the like), and news content (e.g., business, sports, politics, stock prices). As further explained in Section B below, the list of passenger preferences for a passenger may include additional or alternative entertainment categories derived based on an analysis of the passenger's personal information (e.g., career or age) and/or based on overall entertainment related trends from prior passengers who have travelled on the same or similar travel route.

The edge server 106 can include a passenger module (shown as 330 in FIG. 3) that can obtain the list of passenger preferences from the ground server 116. The passenger module can send to the content module the seat numbers of the passengers and the associated one or more predicted entertainment preferences of the passengers so that the content module can send commands or messages to the appropriate seatback devices 104 to display entertainment options tailored to the passengers. For example, if the predicted entertainment preferences indicate that a passenger enjoys western movies and football, the content module can send a command to the seatback device located in front of the passenger to display information about one or more western movies (if one or more western movies are stored on the edge server 106) and to display football related news. A seatback device can display on a GUI information about one or more entertainment options based on the one or more predicted entertainment preferences of a passenger that sits behind and operates that seatback device. The edge server 106 stores the list of passenger preferences in the database 108. The database 108 can be stored in the edge server 106.

In some embodiments where the passengers use PEDs 112 to obtain multimedia contents, the content module can send commands to the PEDs 112 associated such passengers to show entertainment content based on the one or more predicted entertainment preferences of the passengers. For example, when a passenger first starts using his or her PED on the airplane 102, the passenger may enter his or her seat number or name via the GUI on the PED, and the PED can send such information along with the PED's identifier (e.g., MAC address or IP address) to the passenger module of the edge server 106. Based on the received seat number or name of the passenger and the obtained list of passenger preferences, the passenger module can associate one or more predicted entertainment preferences of the passenger with the PED operated by the passenger. The passenger module can send the one or more predicted entertainment preferences and the associated PED identifiers to the content module. Thus, for PEDs 112 operated by a plurality of passengers, the content module can use the PED identifiers and the associated one or more predicted entertainment preferences of the passengers to send commands or messages to the appropriate PED to display entertainment options tailored to the passengers. A PED can display on a GUI information about one or more entertainment options based on the one or more predicted entertainment preferences of a passenger that operates that PED.

A seatback device or PED can obtain from a passenger a request to display an entertainment option based on the one or more predicted entertainment preferences. Continuing with the example described above, based on a message received from the content module to show one or more entertainment options, the seatback device or PED can present on a GUI selectable icons for one or more western movies and football related news. The selectable icons may be designed to allow the passenger to select a movie to be played or to read or watch news related to football. When a passenger selects an entertainment option, the seatback device or PED can send to the edge server 106 a message that includes the selected entertainment option so that the edge server 106 can provide or enable the selected content to be displayed on the seatback device or PED. The passenger module of the edge server 106 stores the list of passenger preferences in the database 108. Thus, the passenger module can update the predicted entertainment preferences stored in the database 108 for a passenger based on the passenger selected entertainment option received in the message from a seatback device.

In some embodiments, the selectable icons on the GUI can also enable a passenger indicate whether he or she prefers the displayed entertainment options. In an example implementation, a selectable icon for a displayed entertainment option include one or more selectable passenger preference indicators such as a "like" and/or "dislike" button(s) displayed adjacent to (e.g., top or bottom of) the selectable icon. If a seatback device or PED receives indications via its GUI that a passenger "likes" a western movie and "dislikes" another western movie, the seatback device or PED can send to the passenger module of the edge server 106 a message that includes such updated preferences. Since the passenger module stores the list of passenger preferences in the database 108, the passenger module can update the predicted entertainment preferences stored in the database 108 for a passenger based on the one or more updated preferences received in the message from a PED.

The edge server 106 can update the one or more predicted entertainment preferences of passengers stored in the database 108 based on receiving messages that indicate whether passengers have selected entertainment options to be displayed or whether passengers have provided updated preferences. In some embodiments, the edge server 106 can update the list of passenger preferences in-flight based on entertainment related selections indicated by the passengers. The edge server 106 may transmit to the ground server 116 via the antenna 114 the updated list of passenger preferences so that the ground server 116 can update the list of passenger preferences stored on database 118. For example, after the airplane 102 has landed at its destination, the edge server 106 may transmit the updated list of passenger preferences to the ground server 116. In some embodiments, the edge server 106 can transmit the updated entertainment preference of one or more passengers to the ground server 116 so that the ground server 116 can update the list of passenger preferences stored on the database 118.

The edge server 106 and/or the ground server 116 updating the list of passenger preferences is an advantageous technical feature at least because such a list can enable the edge server 106 to provide tailored entertainment options to each passenger for whom one or more predicted entertainment preferences is known and updated. Thus, for example, if a passenger updates one or more predicted entertainment preferences during a flight on a first airplane and then subsequently travels on a second airplane, the edge server of the second airplane can use the updated passenger preference to better provide entertainment options tailored to that passenger. In this example, the ground server 116 may provide to the edge server of the second airplane multimedia content for the passenger that is related to the updated passenger preference. Thus, the entertainment content stored in the edge server 106 can be frequently updated based on entertainment preferences of passengers every time a new set of passengers come aboard the airplane 102.

Figure 2:
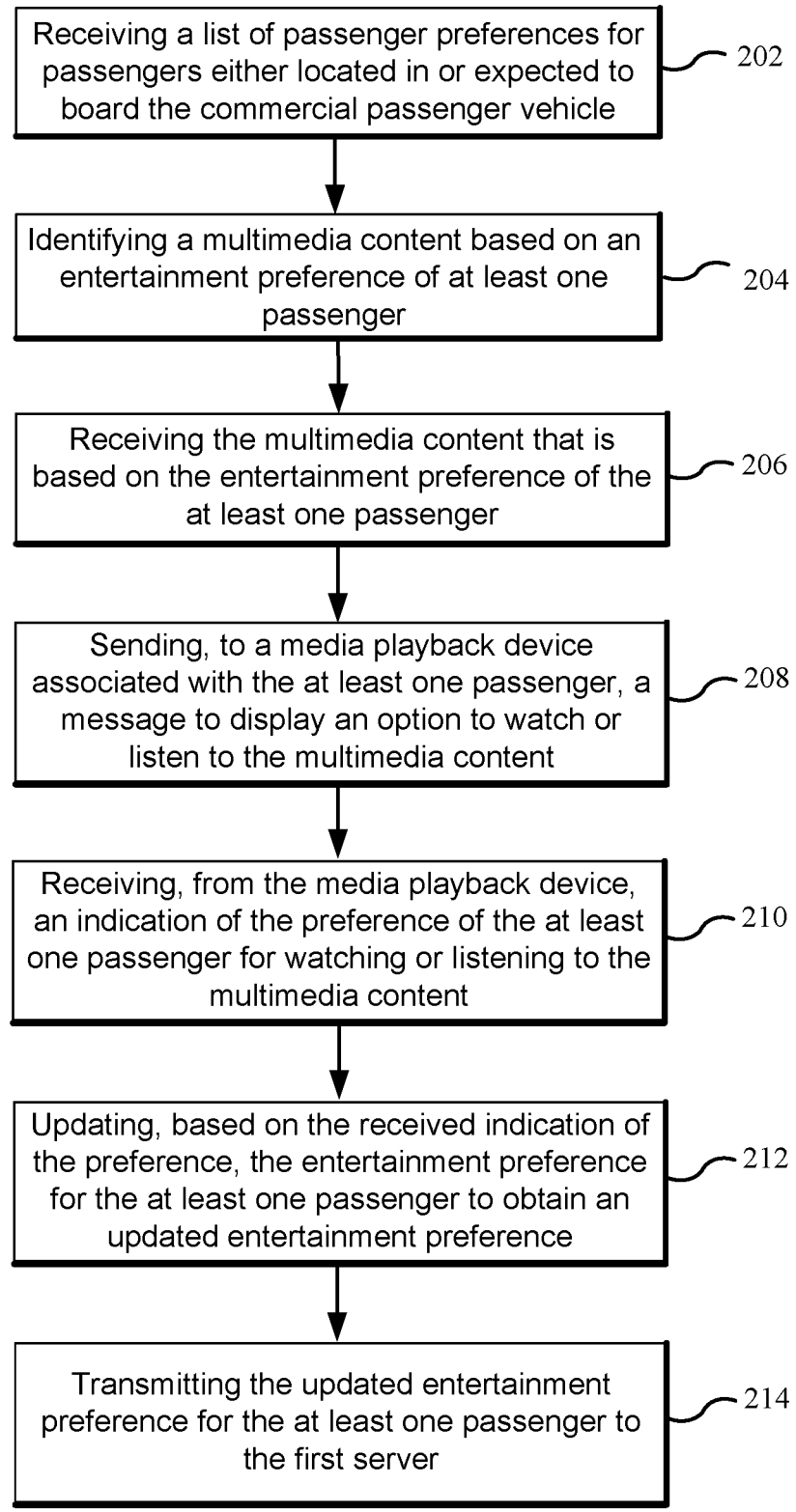
FIG. 2 shows an exemplary flowchart of a method of updating passenger preferences in a vehicle entertainment system by a server located in a commercial passenger vehicle.

FIG. 2 shows an exemplary flowchart of a method of updating passenger preferences in a vehicle entertainment system by a server located in a commercial passenger vehicle. Operations 202 to 204 can be performed by a first server, and operations 206 to 214 can be performed by a second server. At the receiving operation 202, a list of passenger preferences for passengers either located in or expected to board the commercial passenger vehicle is received. The list of passenger preferences indicates entertainment preferences for the passengers. At the identifying operation 204, a multimedia content is identified based on an entertainment preference of at least one passenger.

At the receiving operation 206, the multimedia content that is based on the entertainment preference of the at least one passenger is received. At the sending operation 208, a message is sent to a media playback device associated with the at least one passenger, where the message can instruct the media playback device to display an option to watch or listen to the multimedia content. Upon receiving the message, a graphical user interface (GUI) of the media playback device displays a selectable icon for the multimedia content along with one or more selectable passenger preference indicators that enable the at least one passenger to indicate a preference for watching or listening to the multimedia content.

Operation 210 is performed to receive, from the media playback device, an indication of the preference of the at least one passenger for watching or listening to the multimedia content. At the updating operation 212, based on the received indication of the preference, the entertainment preference for the at least one passenger is updated to obtain an updated entertainment preference. At the transmitting operation 214, the updated entertainment preference for the at least one passenger is transmitted to the first server.

In some embodiments, the first server is configured to further perform the following operations: receiving a second list of passenger preferences for a second set of passengers either located in or expected to board a second commercial passenger vehicle, where the second list of passenger preferences indicates entertainment preferences for the second set of passengers, and where the second set of passenger comprises the at least one passenger that previously travelled on the commercial passenger vehicle; and identifying a second multimedia content based on the updated entertainment preference of the at least one passenger. In such embodiments, a third server located in the second commercial passenger vehicle is configured to perform the following operations: receiving the second multimedia content that is based on the updated entertainment preference of the at least one passenger; and sending, to the media playback device or a second media playback device associated with the at least one passenger, a message to display an option to watch or listen to the second multimedia content.

In some embodiments, the first server is not located within any passenger vehicle, and is a fixed location server, e.g., a ground-based server, and is configured to service or services more than one vehicle.

In some embodiments, the media playback device is a mobile device that belongs to the at least one passenger, or the media playback device is located behind a headrest of a seat in the commercial passenger vehicle and the second media playback device is located behind a second headrest of a second seat in the second commercial passenger vehicle.

In some embodiments, the list of passenger preferences includes names of the passengers and one or more entertainment preferences for each passenger. In some embodiments, the one or more entertainment preferences includes any one of or more of a movie category, a music genre, a television show category, and news content category. In some embodiments, the one or more entertainment preferences for at least some passengers are obtained based on social media information obtained for the at least some passengers from a social media platform.

In some embodiments, the one or more entertainment preferences are obtained based on a social media trend obtained from a social media platform. In some embodiments, the preference includes an indication of whether the at least one passenger likes or dislikes the multimedia content. In some embodiments, the first server is a ground-based server. In some embodiments, the first server is not located within any passenger vehicle, and is a fixed location server, e.g., a ground-based server, and is configured to service or services more than one vehicle.

B. Generating List of Passenger Preferences

In FIG. 1, the ground server 116 stores in a database 118 a list of passenger preferences for passengers that are located in or expected to board the aircraft 102. As mentioned above, the list of passenger preferences may include information about passengers that may have been collected by the airlines and/or by a third-party (e.g., a social media platform). In some embodiments, for each flight, a passenger module of the ground server 116 may obtain names of the passengers that are expected to board the airplane 102 and the one or more predicted entertainment preferences previously indicated by at least some of the passengers who they signed up for the airplane's frequent flyer program. In such embodiments, the one or more predicted entertainment preferences may be stored in a database on a server that manages an airlines' frequent flyer program. This server's database associates the predicted entertainment preferences of the passengers with their frequent flyer membership identifiers. When passengers enter their names and frequent flyer identifiers to purchase their tickets, the passengers' names and frequent flyer identifiers can be sent to the ground server 116 whereupon the ground server 116 can retrieve the predicted entertainment preferences associated with the frequent flyer identifiers from the frequent flyer program related server. The passenger module of the ground server 116 can store in the list of passenger preferences the names of the passengers that are expected to board the airplane 102 and one or more predicted entertainment preferences of at least some of the passengers.

In some other embodiments, for each flight, the passenger module of the ground server 116 may obtain names of the passengers that are expected to board the airplane 102 and one or more additional personal information about the passengers (e.g., birthdate, country of birth, social media followings of the passenger, career interest, etc.,) to be included in the list of passenger preferences. Based on the additional personal information, the content server of the ground server 116 may include in the list of passenger preferences, information about multimedia content that the edge server 106 can present to the passengers. In some embodiments, the ground server 116 can identify the multimedia contents that are relevant to the list of passengers. For example, if a passenger's country of birth is Sweden, the content server of the ground server 116 may identify the latest news articles (or their weblinks) about Sweden that can be shown to the passenger. In this example, the ground server 116 can send the list of passenger preferences with the multimedia content for the passenger to the edge server 106 so that the edge server can send a command to the seatback device or PED associated with the passenger to show the latest news articles about events happening in Sweden.

In yet some other embodiments, for each flight, the content module of the ground server 116 may include in the list of passenger preferences the names of the passengers that are expected to board the airplane 102 and one or more types of social trends, social analysis (or social analytics), or social predictions related to current pattern of press releases of the type and machine learning associated with them. In such embodiments, the content module of the ground server 116 may, upon approval from a passenger, retrieve the passenger's social media information (e.g., birthdate, likes, dislikes, hobbies, etc.,) from a social media platform server. Based on the passenger's social media information, the ground server 116 may identify multimedia content relevant to that passenger. For example, the content module of the ground server 116 may employ machine learning techniques to identify multimedia contents that are identified as being relevant to other people who have similar social profile as the passenger whose social media information provides the passenger's social profile.

Figure 5:
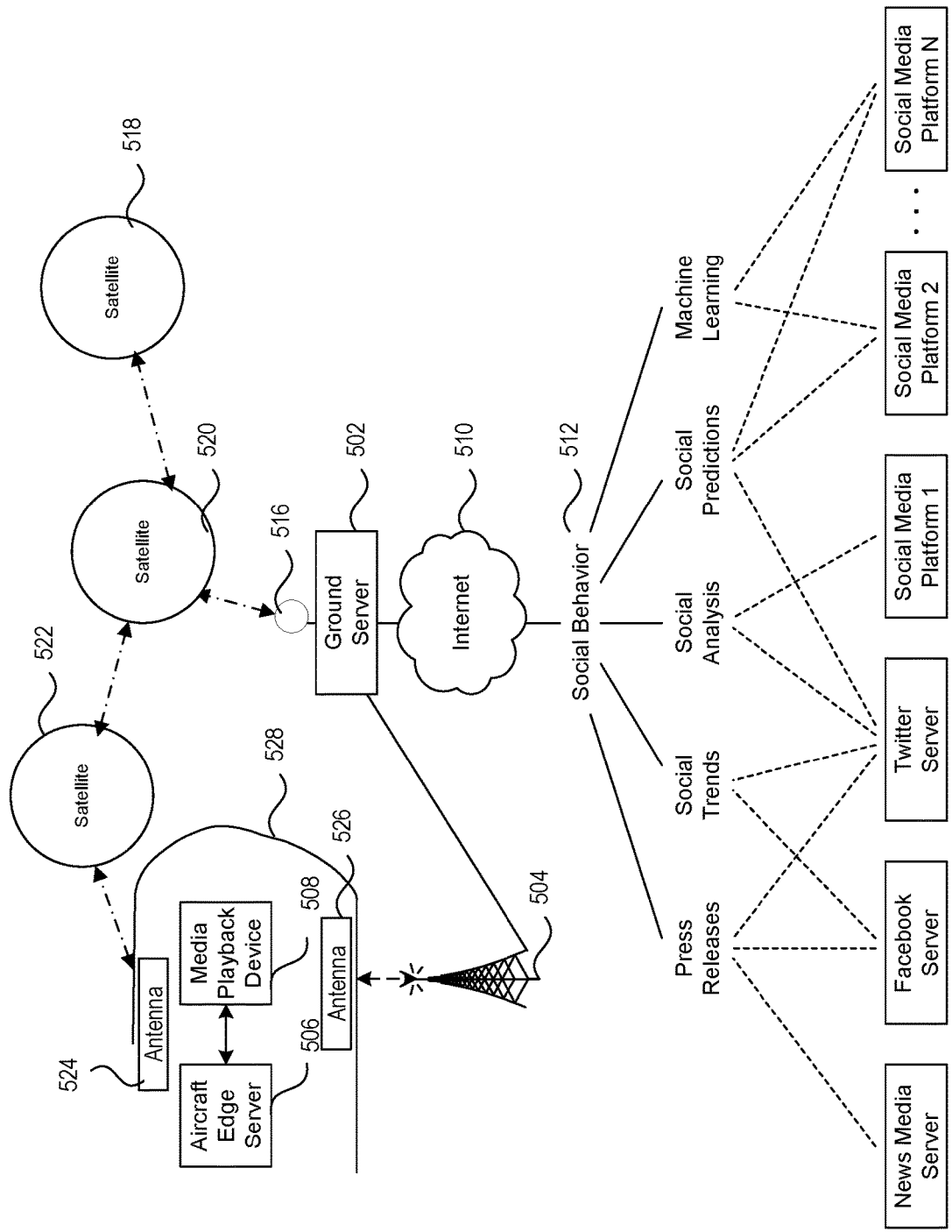
FIG. 5 shows an overview of a system to provide content to a passenger on a vehicle based on social behavior.

FIG. 5 shows an overview of a system to provide content to a passenger on a vehicle 528 (e.g., aircraft, bus, train, or the like) based on social behavior. In this example, the system a media playback device 508 located on an airplane (e.g., aircraft 528) and in communication with an edge server 506 that is in communication with a ground server 502 through an antenna 526 (on aircraft 528) via a satellite or a terrestrial communication station 504 and/or one or more satellites 518, 520, 522 through ground server antenna 516 to antenna 524 (on aircraft 528). The ground server 502 can be communicably coupled to the Internet 510 to retrieve social behavior 512 related information to provide content to the edge server 506 on the airplane, where the content can be displayed to the passengers based on the techniques described in this patent document.

As shown in FIG. 5, social behavior 512 can include press releases, social trends, social analysis, social predictions, and machine learning based on information provided by social media platforms (e.g., Facebook or Twitter servers). Social behavior 512 can also be relevant to the passengers in an airplane. For example, an audio company may issue a press release on a new audio product. In this example, if the ground server 502 determines that a passenger on an airplane has a preference for products manufactured by the audio company, then the ground server 502 may retrieve the press release and display it to the passenger along with information about pricing and availability for that audio product. In another example, if a social trend for a destination to which a passenger is traveling is a prestigious new award received by a restaurant at the destination, then the ground server 502 may, based on a passenger's preference for culinary events, display the news of the award to the restaurant along with information to allow the passenger to make reservation at the restaurant while the passenger is on the airplane.

FIG. 5 shows machine learning that can be performed by obtaining social behavior 512 information from the social media platform. In some embodiments, the ground server 502 may obtain social behavior information 512 and perform machine learning techniques (e.g., Naïve Bayes) to determine whether social trend, social analytics, or social preference relate to preferences of passengers located in an airplane.

Social trends can be defined as any type of activity that is participated in by society as a whole. Social trends can be derived from social media platforms and can be referred to as social media trends. For example, using social media platforms, certain populations can indicate social trends as to whether they prefer certain types of music, fashion or activity. These trends can be indicated to a ground server from social media servers belonging to social media platforms (e.g., Twitter, Facebook, LinkedIn). For example, social trend in the United States around 2007 time-frame can include mortgage crisis which can indicate that U.S. population may be more inclined to saving their income and improving their financial literacy. Social trends can change as time passes so that what is popular at one time may be not be popular at another time. As technology progresses, the changes in social trends do as well. For instance, beepers and cordless phones were once all the rage but were eventually replaced with cell phones and iPads.

Social media platforms such as Facebook and Twitter have introduced new ways to identify and use social trends by introducing a new way to connect with people from far and near. Social networking began a long-lasting type of social trend unlike some shorter-lived trends like tennis shoes with built-in roller blades and disco music. Social trends are constantly changing, and many companies use their ability to anticipate the social change as part of their business marketing campaign.

Figure 6:
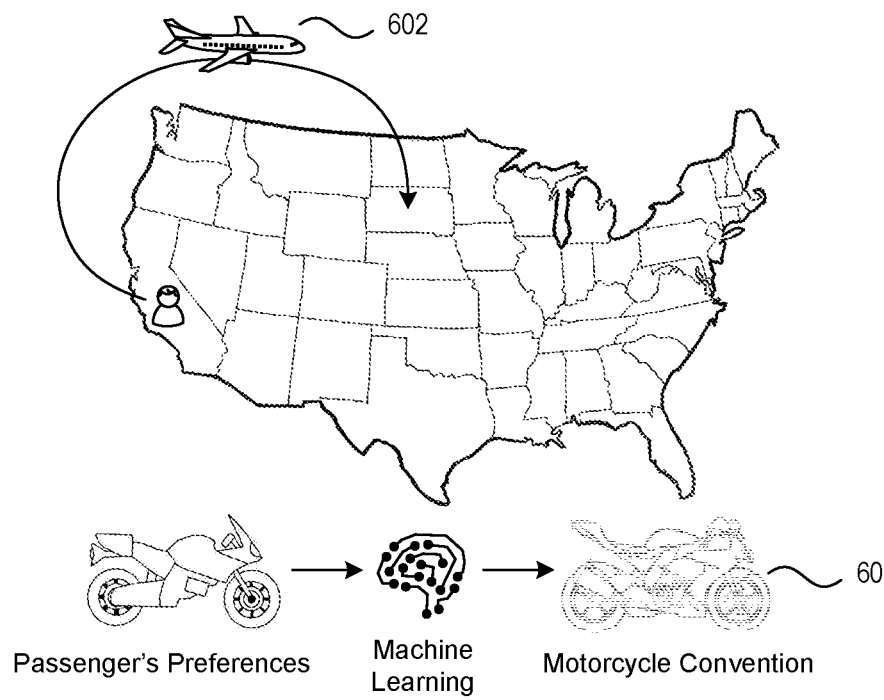
FIG. 6 shows an exemplary system for presenting content to a passenger based at least on social media trends.
Figure 6:
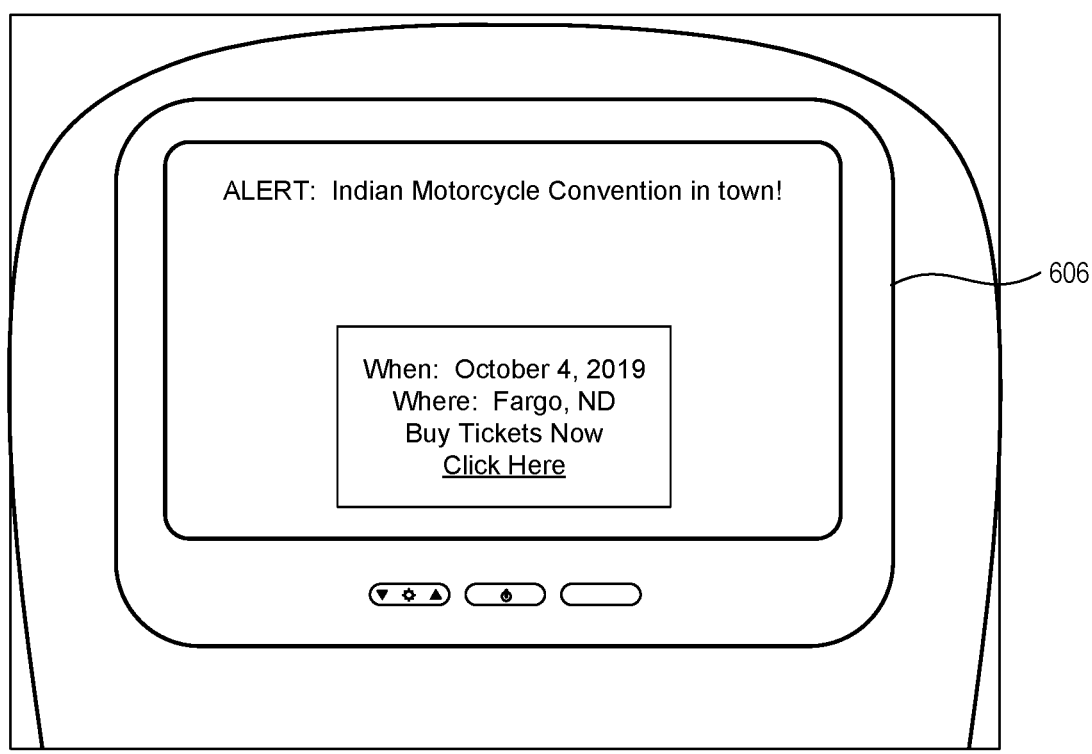

FIG. 6 shows an exemplary system for presenting content to a passenger based at least on social media trends. In FIG. 6, a passenger who has previously indicated that he or she has a preference for motorcycles is flying in an airplane 602 from Los Angeles to North Dakota for business for one-week. The ground server described in this patent document can, based on press release and according to social media trends, determine that the passenger's preference is for motorcycles and that there is a motorcycle convention being held at the destination to which the passenger is travelling and during the time when the passenger will be visiting the destination. In some embodiments, the ground server can determine that the motorcycle convention is relevant to or related to the passenger's preference based on machine learning techniques (e.g., Naïve Bayes) as shown in 604.

The ground server can send to the edge server in the airplane 602 content related to the motorcycle convention (e.g., a brochure or flyer) to inform the passenger about the motorcycle convention. The media playback device 606 associated with the passenger can display to the passenger on the airplane 602 the social media posting (e.g., alert or content about the motorcycle convention). In some embodiments, the displayed social media posting can also provide to the passenger an option to purchase a ticket and/or obtain other information about the motorcycle convention event on aircraft during flight.

Social analysis can be described as the practice of examining a social problem, issue or trend, with the possible aim of prompting changes in the situation being analyzed. A social problem can be a situation that is viewed by a group or population as being undesirable. For example, a group of people may consider climate change to be a social problem, and another group of people may consider a lack of healthy diet to be a social problem. Social analysis can address such issues through qualitative research and/or quantitative multivariate approaches. Multivariate analysis is a field of statistical analysis and data analytics that deals with variables and their relationships. Social analysis can be used to identify strategies and policies that can have positive social impact. For example, after analyzing the result of a customer survey, a computer may determine using machine learning techniques that increased efforts to identify recipes to prepare nutritious meals would be viewed positively to the population that considers lack of healthy diet in the United States to be a social problem. Social analysis is different from social media analytics, which studies data collected from social networking sites.

Social media analytics is the practice of gathering data from social media websites and analyzing that data using social media analytics tools to make business decisions. The most common use of social media analytics is to mine customer sentiment to support marketing and customer service activities.

Figure 7:
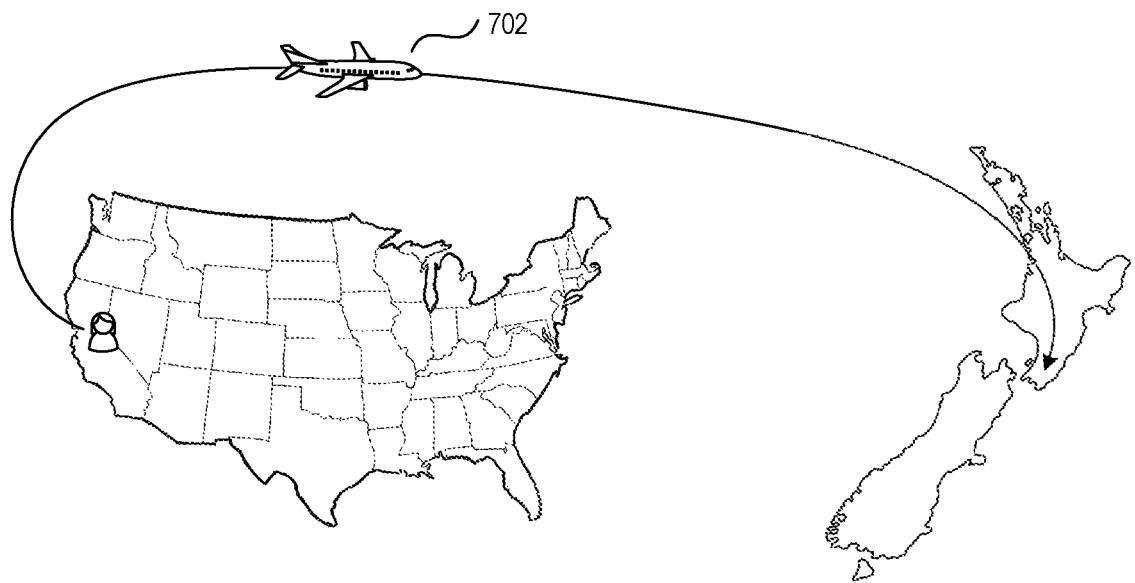
FIG. 7 shows another exemplary system for presenting content to a passenger based at least on social analytics.
Figure 7:
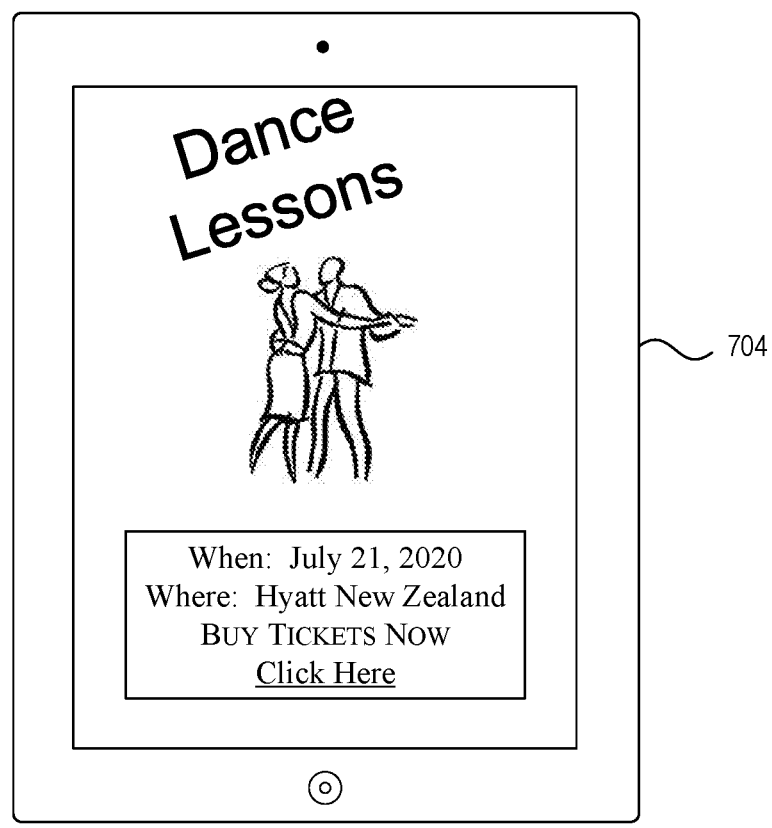

FIG. 7 shows another exemplary system for presenting content to a passenger traveling in an airplane 702 based at least on social analytics. In FIG. 7, a media playback device 702 associated with a passenger flying from Bakersfield to New Zealand for chocolate convention may receive a social media press release on dance related shows in New Zealand. The social media press release is sent by a ground server based on social analytics as described in this patent document. The social analytics can be based on prior square dancing lessons and training and latest trends on dance at New Zealand. The ground server can also send to the media playback device 704 information about availability of tickets during the time that the passenger stays in New Zealand and/or other events in New Zealand based on the passenger's social media preferences (e.g., friends listing) provided by the passenger's social media platform (e.g., Facebook).

In some embodiments, social behavior may provide to the ground server metrics related to passengers' engagement. For example, the ground server can determine the identity and the number of passengers that follow an airline company on its social media platform or mention the airline company's name on social media platform. Such a social media monitoring can enable the ground server to determine what passengers are saying about the airline company or their experiences on the airplane.

In some embodiments, the ground server can perform social media analysis based on sentiment analytics. This practice involves natural-language-processing machine learning algorithms used by the ground server to parse a text in a passenger's social media post about an airline company to understand the meaning behind that passenger's statement. These algorithms can create a quantified score of the passenger's feelings toward a company based on social media interactions and give reports to management on how well the company interacts with passengers.

There are several social media analytics tools (e.g., TensorFlow) for analyzing data found in social media platforms content (e.g., Twitter or Facebook posts).

As shown in FIG. 5, a press release (e.g., news release, media release, press statement or video release) can be an official statement delivered to news media platforms or social media platforms for the purpose of providing information to the population at large or to specific groups within the population. For example, as mentioned above, if a passenger has indicated that she or he prefers to receive content about new audio products from an audio company, then a press release from such a company can be sent to the passenger's media playback device by the ground server.

Figure 8:
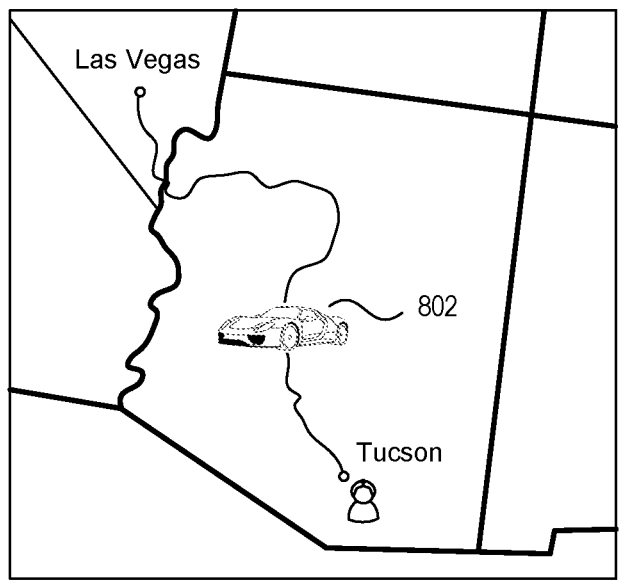
FIG. 8 shows another exemplary system for presenting content to a person in a vehicle (e.g., car) based on at least on social trends.
Figure 8:
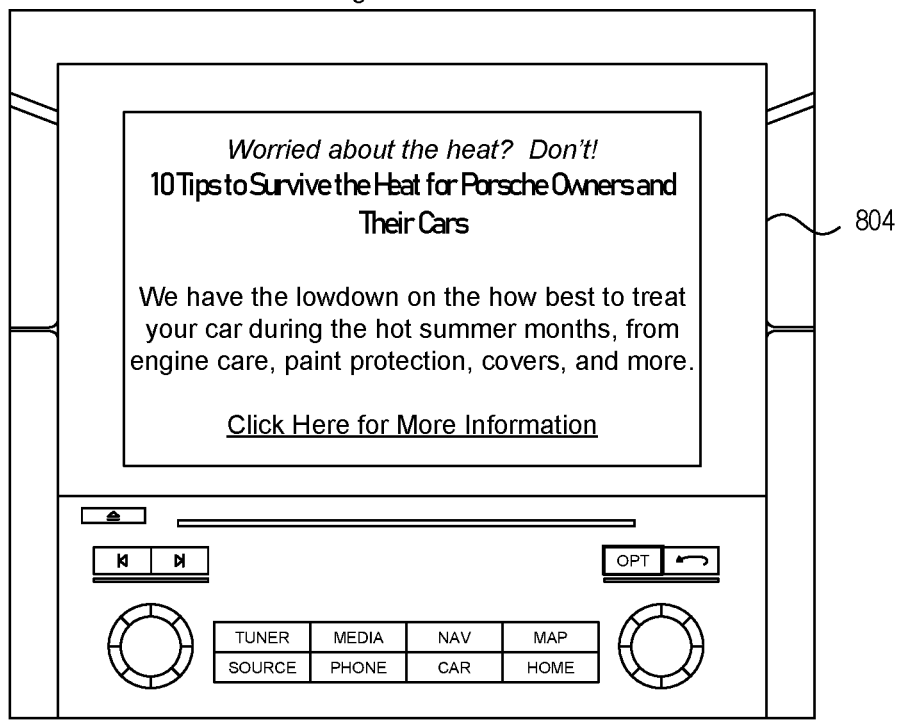

FIG. 8 shows another exemplary system for presenting content to a person in a car 504 based on at least on social trends. In FIG. 8, a media playback device 804 in the car 802 belonging to person who has previously indicated that she prefers content will be sent content to alert the person about social trends at the destination to which the person is driving. For example, a ground server described in this patent document can determine that the passenger is traveling from Tucson, Ariz. to Las Vegas, Nev. (as shown in FIG. 8) in his or her Porsche and can determine social trends for Porsche owners in Las Vegas and latest tune up techniques for summer driving during above 100-degree weather in Vegas and convention information. The ground server can send to the media playback device 804 in the person's car 802 the content relevant to the person's travel. For example, as shown in FIG. 8, the ground server can send articles to help the person keep his or her car in the best condition while driving in the hot desert environment.

In some embodiments, for each flight, the content module of the ground server 116 may include in the list of passenger preferences one or more multimedia contents based on information from social media platforms and based on information about the flight. For example, information from social media trends may indicate similar, complementary, or conflicting social media trends, social analytics, or systems characteristics of any or all the following: information, ideas, career interests, other forms of expression, socialization offerings, number of blogs, age, failure social networks, successful social networks. Information about the flight may include any one or more of the following: date in service of the airplane, last service date of the airplane, type or length of flight, total flight time on a current airplane, weather activities, past maintenance records or activities of an airplane, time(s) of flights, number of consecutive day(s) of flight, reasons or any recorded circumstances for flight (e.g., cargo drop off, mission to a particular geographical area, taxi overseas for repair or maintenance, or battery particulars), number of passengers, number of stops, or the like.

In some embodiments, for each flight, the content module of the ground server 116 may include in the list of passenger preferences one or more multimedia contents based on information from social media platforms (e.g., a social media trend or a trending topic) and based on information about the flight. For example, if a ground server 116 determines that a flight is travelling to a destination for which a trending topic on a social media platform is news about an extreme weather event (e.g., hurricane) at that destination, then the ground server 116 can include news article(s) regarding that extreme weather event in the list of passenger preferences. In this example, the entertainment preferences for all the passengers on the flight can include news article(s) regarding the extreme weather event at the destination.

In another example, the content module of the ground server 116 can provide in the list of passenger preferences social media recommendations based on the predicted entertainment preferences of the passengers. In another example, the content module of the ground server 116 can provide in the list of passenger preferences the predicted passenger preferences with waste reduction (e.g., time, event, or situational predictions) to others (wholesalers, retail stores, on-line vendors, marketplace participants, or the like) of trends, needs, and social media usage of the one or more airlines responsive to predicted entertainment preferences.

A benefit of the exemplary vehicle entertainment systems is that it can minimize cost based on crew maintenance personnel or third-party personnel providing social media outcomes to the predicted entertainment preferences listings of the passengers. Thus, the airlines can reduce overall costs and/or improve reliability matching accurate social media outcomes to a passenger and/or share in social media process by following social media of one or more items based on predicted entertainment preferences listings.

The ground server 116 may use the combination of the techniques described above to generate the list of passenger preferences. For example, the ground server 116 may generate the list of passenger preferences by using the frequent flyer related server to obtain one or more predicted entertainment preferences previously indicated by at least some of the passengers, and by obtaining multimedia content for at least some of the passengers based on the additional personal information that can be retrieved about them.

Figure 3:
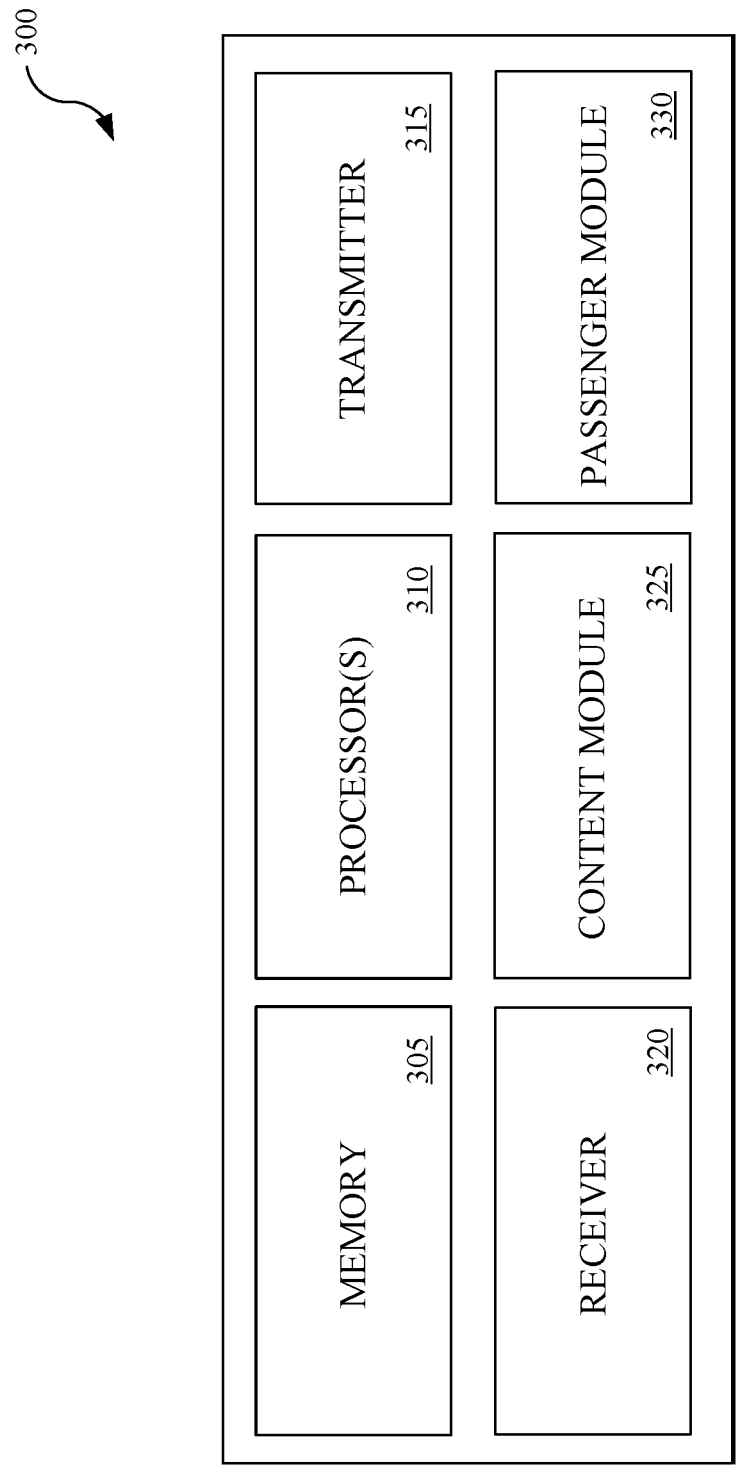
FIG. 3 shows an exemplary block diagram of an edge server or a ground server that are part of an exemplary vehicle entertainment system.

FIG. 3 shows an exemplary block diagram of an edge server or the ground server that are part of an exemplary vehicle entertainment system. The edge server or ground server 300 includes at least one processor 310 and a memory 305 having instructions stored thereupon. The instructions upon execution by the processor 310 configure the edge server 300 to perform the operations described in FIGS. 1 to 2, and to perform the operations described for the content module 325 and the passenger module 330, and a database (108 or 118 in FIG. 1). The instructions upon execution by the processor 310 can also configure the edge server or ground server 300 to perform the operations described in the various embodiments described in this patent document. The transmitter 315 transmits or sends information or data to another device (e.g., ground server, seatback devices, or PEDs). The receiver 320 receives information or data transmitted or sent by another device (e.g., edge server, seatback devices, or PEDs).

Figure 4:
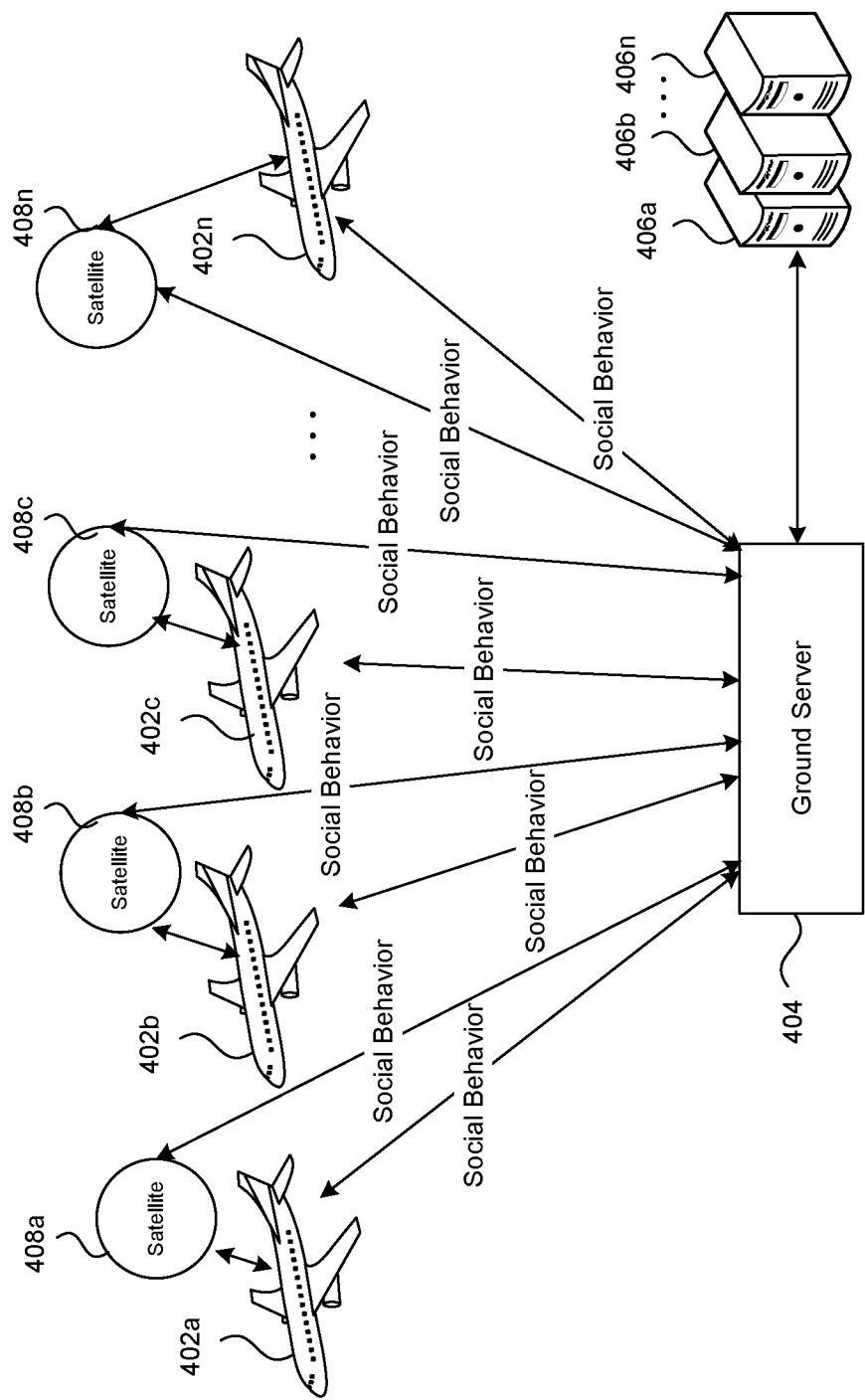
FIG. 4 shows multiple vehicle entertainment systems operating with a ground server.

FIG. 4 shows multiple vehicle entertainment systems operating with a ground server. Each of the plurality of airplanes 402a-402n include a vehicle entertainment system as shown in FIG. 1. In each airplane an edge server can communicate with a ground server 404 via an antenna directly or through satellites 408a-408n signaling. For a set of passengers in each airplane, the ground server may store a list of passenger preferences that can include names of the passengers and one or more entertainment preferences for each passenger. The ground server 404 can also receive social media information about at least some of the passengers in the airplanes 402a-402n from one or more social media platform servers. In some embodiments, the social media information can provide passenger usage data such as messages that the at least some passengers have posted about the airlines or their travel as they travel to their destinations.

The edge server in each airplane can receive social behavior content from the ground server 404. The social behavior content can be content based on social trends, social analyses, or social predictions, as described in this patent document. The ground server can determine the relevant social behavior content based on the social media information about at least some of the passengers received from the edge server of the airplanes 402a-402n.

This patent document describes the exemplary vehicle entertainment systems in the context of a commercial passenger vehicle such as an airplane for ease of description. The exemplary vehicle entertainment systems could be employed in other types of commercial passenger vehicle such as a train, a ship, or a bus.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system for providing infotainment to passengers on a commercial passenger vehicle, the system comprising:
   a first server configured to perform a first method comprising:
      receiving a list of passenger preferences for passengers either located in or expected to board the commercial passenger vehicle, wherein the list of passenger preferences indicates one or more entertainment preferences for the passengers; and
      identifying a multimedia content based on a social media trend associated with: an entertainment preference of at least one passenger, a destination to which the at least one passenger is traveling, and a time when the at least one passenger will be at the destination;
   a second server located in the commercial passenger vehicle, the second server configured to perform a second method comprising:
      receiving the multimedia content that is based on the entertainment preference of the at least one passenger;
      sending, to a media playback device associated with the at least one passenger, a message to display an option to watch or listen to the multimedia content, wherein a graphical user interface (GUI) of the media playback device displays a selectable icon for the multimedia content along with one or more selectable passenger preference indicators that enable the at least one passenger to indicate a preference for watching or listening to the multimedia content;
      receiving, from the media playback device, an indication of the preference of the at least one passenger for watching or listening to the multimedia content;
      updating, based on the received indication of the preference, the entertainment preference for the at least one passenger to obtain an updated entertainment preference; and
      transmitting the updated entertainment preference for the at least one passenger to the first server.

2. The system of claim 1, further comprising:
   the first server configured to perform the first method further comprising:
      receiving a second list of passenger preferences for a second set of passengers either located in or expected to board a second commercial passenger vehicle, wherein the second list of passenger preferences indicates entertainment preferences for the second set of passengers, and wherein the second set of passenger comprises the at least one passenger that previously travelled on the commercial passenger vehicle; and
      identifying a second multimedia content based on the updated entertainment preference of the at least one passenger;
   a third server located in the second commercial passenger vehicle, the third server configured to perform a third method comprising:
      receiving the second multimedia content that is based on the updated entertainment preference of the at least one passenger; and
      sending, to the media playback device or a second media playback device associated with the at least one passenger, a message to display an option to watch or listen to the second multimedia content.

3. The system of claim 2,
   wherein the media playback device is a mobile device that belongs to the at least one passenger, or
   wherein the media playback device is located behind a headrest of a seat in the commercial passenger vehicle and the second media playback device is located behind a second headrest of a second seat in the second commercial passenger vehicle.

4. The system of claim 1, wherein the list of passenger preferences includes names of the passengers.

5. The system of claim 1, wherein the one or more entertainment preferences includes any one of or more of a movie category, a music genre, a television show category, and news content category.

6. The system of claim 1, wherein the one or more entertainment preferences for at least some passengers are obtained based on social media information obtained for the at least some passengers from a social media platform.

7. The system of claim 1, wherein the one or more entertainment preferences are obtained based on social media trends, social analytics, or press releases.

8. The system of claim 1, wherein the preference includes an indication of whether the at least one passenger likes or dislikes the multimedia content.

9. The system of claim 1, wherein the first server is not located within any passenger vehicle, and is a fixed location server and services more than one vehicle.

10. A method implemented by a server on a commercial passenger vehicle, comprising:
   receiving, by the server, a multimedia content based on a social media trend associated with: an entertainment preference of at least one passenger, a destination to which the at least one passenger is traveling, and a time when the at least one passenger will be at the destination;
   sending, to a media playback device in the commercial passenger vehicle and associated with the at least one passenger, a message to display an option to watch or listen to the multimedia content,
      wherein a graphical user interface (GUI) of the media playback device displays a selectable icon for the multimedia content along with one or more selectable passenger preference indicators that enable the at least one passenger to indicate a preference for watching or listening to the multimedia content;
   receiving, from the media playback device, an indication of the preference of the at least one passenger for watching or listening to the multimedia content;
   updating, based on the received indication of the preference, the entertainment preference for the at least one passenger to obtain an updated entertainment preference; and
   transmitting the updated entertainment preference for the at least one passenger to a first server, the first server being a fixed location server and services more than one vehicle.

11. The method of claim 10, wherein the entertainment preferences are obtained from a list of passenger preferences that includes names of the passengers and one or more entertainment preferences for each passenger.

12. The method of claim 11, wherein the one or more entertainment preferences includes any one of or more of a movie category, a music genre, a television show category, and news content category.

13. The method of claim 11,
   wherein the one or more entertainment preferences for at least some passengers are obtained based on social media information obtained for the at least some passengers from a social media platform, or
   wherein the one or more entertainment preferences for at least some passengers are obtained based on a social media trend obtained from a social media platform, or
   wherein the one or more entertainment preferences for at least some passengers are obtained based on social analytics or press releases.

14. The method of claim 10, wherein the preference includes an indication of whether the at least one passenger likes or dislikes the multimedia content.

15. An apparatus comprising a processor and a memory, the apparatus implemented on a commercial passenger vehicle and configured to perform a method, the method comprising:
   receiving a multimedia content based on a social media trend associated with both an entertainment preference of at least one passenger, a destination to which the at least one passenger is traveling, and a time when the at least one passenger will be at the destination;
   sending, to a media playback device in the commercial passenger vehicle and associated with the at least one passenger, a message to display an option to watch or listen to the multimedia content,
      wherein a graphical user interface (GUI) of the media playback device displays a selectable icon for the multimedia content along with one or more selectable passenger preference indicators that enable the at least one passenger to indicate a preference for watching or listening to the multimedia content;
   receiving, from the media playback device, an indication of the preference of the at least one passenger for watching or listening to the multimedia content;
   updating, based on the received indication of the preference, the entertainment preference for the at least one passenger to obtain an updated entertainment preference; and
   transmitting the updated entertainment preference for the at least one passenger to a first server that is in a fixed location and services more than one passenger vehicle and is not located within any passenger vehicle.

16. The apparatus of claim 15, wherein the entertainment preferences are obtained from a list of passenger preferences that includes names of the passengers and one or more entertainment preferences for each passenger.

17. The apparatus of claim 16, wherein the one or more entertainment preferences includes any one of or more of a movie category, a music genre, a television show category, and news content category.

18. The apparatus of claim 16,
   wherein the one or more entertainment preferences for at least some passengers are obtained based on social media information obtained for the at least some passengers from a social media platform, or
   wherein the one or more entertainment preferences for at least some passengers are obtained based on a social media trend obtained from a social media platform, or
   wherein the one or more entertainment preferences for at least some passengers are obtained based on social analytics or press releases.

19. The apparatus of claim 15, wherein the preference includes an indication of whether the at least one passenger likes or dislikes the multimedia content.

* * * * *